July 30, 1929.  C. HEUMADER  1,722,916
AUTOMOBILE TOURIST BED
Filed Oct. 4, 1927  2 Sheets-Sheet 2

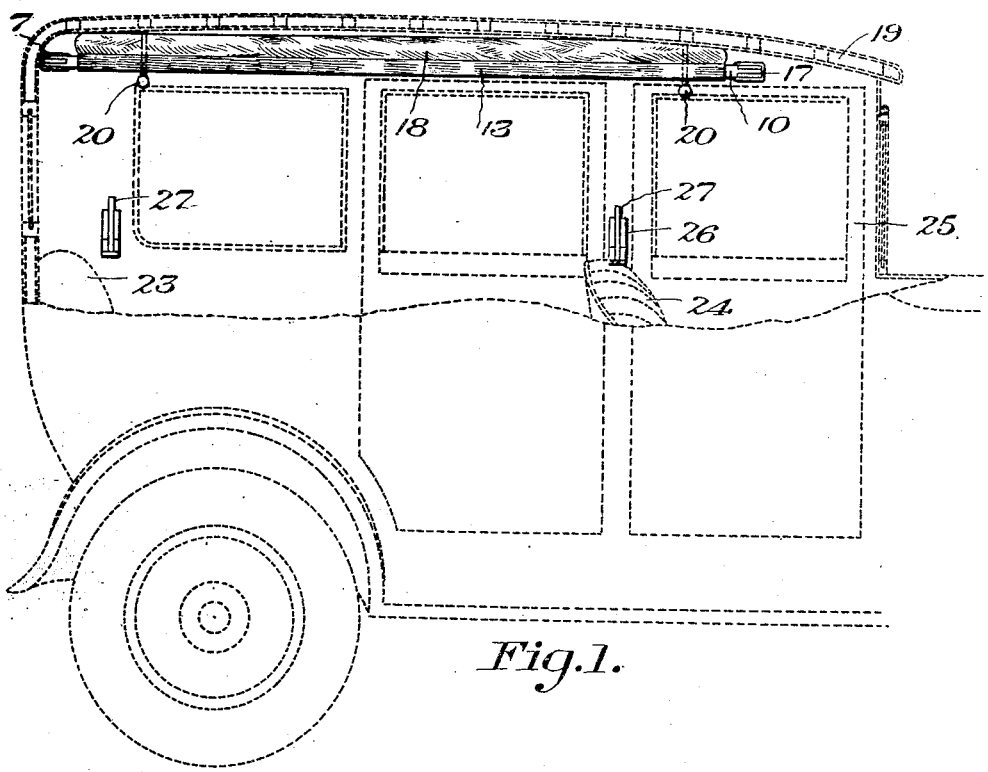
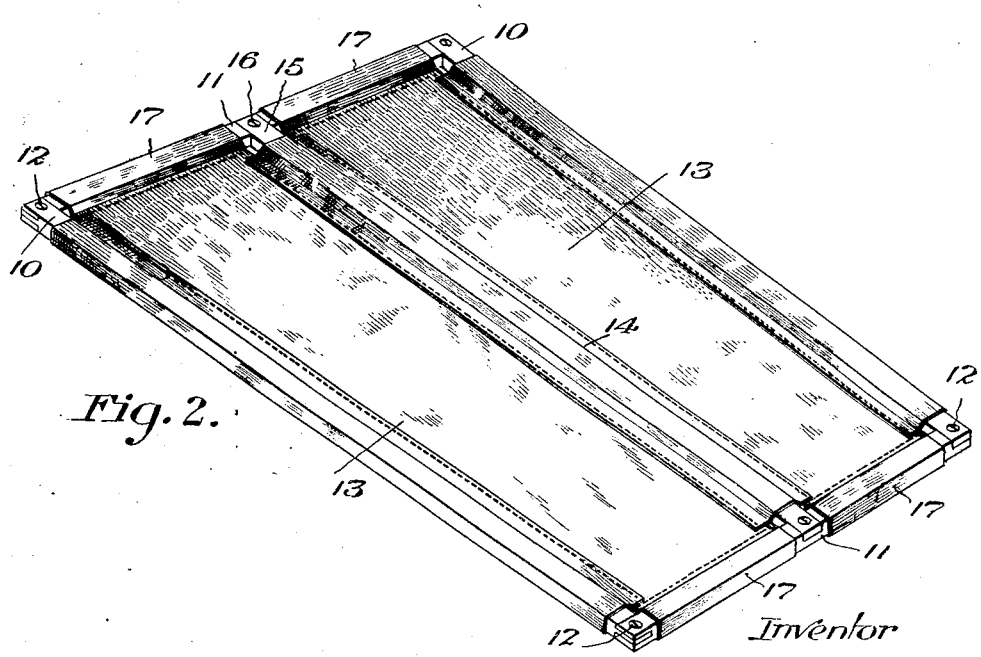

Inventor
Christian Heumader
By Mawhinney & Mawhinney Attys.

Patented July 30, 1929.

1,722,916

UNITED STATES PATENT OFFICE.

CHRISTIAN HEUMADER, OF ST. JOSEPH, MISSOURI.

AUTOMOBILE TOURIST BED.

Application filed October 4, 1927. Serial No. 223,918.

The present invention relates to beds, and more particularly to a bed adapted for use in automobiles.

An object of this invention is to provide a bed of the non-folding type which may be stored within the top of the automobile out of the way when not in use and which may be easily and quickly adjusted or lowered into position for use and at a suitable level in the vehicle to utilize the tops of seats or to clear the same.

Another object of the invention is to provide an improved structure of bed frame and bed fabric which is adapted to support bedding and the like when in both stored position and in position of use, and which is provided with supporting means readily attachable to the vehicles of present day construction without altering such construction or changing the appearance of the same.

With the foregoing and other objects in view, the invention will be more fully described hereinafter, and will be more particularly pointed out in the claim appended hereto.

In the drawings, wherein like symbols refer to like or corresponding parts throughout the several views.

Figure 1 is an edge view of a bed constructed according to the present invention with its supporting means, the bed being adjusted against the roof or top of the vehicle out of the way when not in use, the dotted lines showing a conventional type of sedan or closed vehicle body to which the attachments are connected.

Figure 2 is a detail perspective view of the bed frame removed from the vehicle.

Figure 3 is a transverse section taken through the bed as applied to the vehicle body and in the position shown in Figure 1, the dotted lines showing the vehicle body and showing the lower supporting brackets 45 folded down in position to receive the bed.

Figure 3:
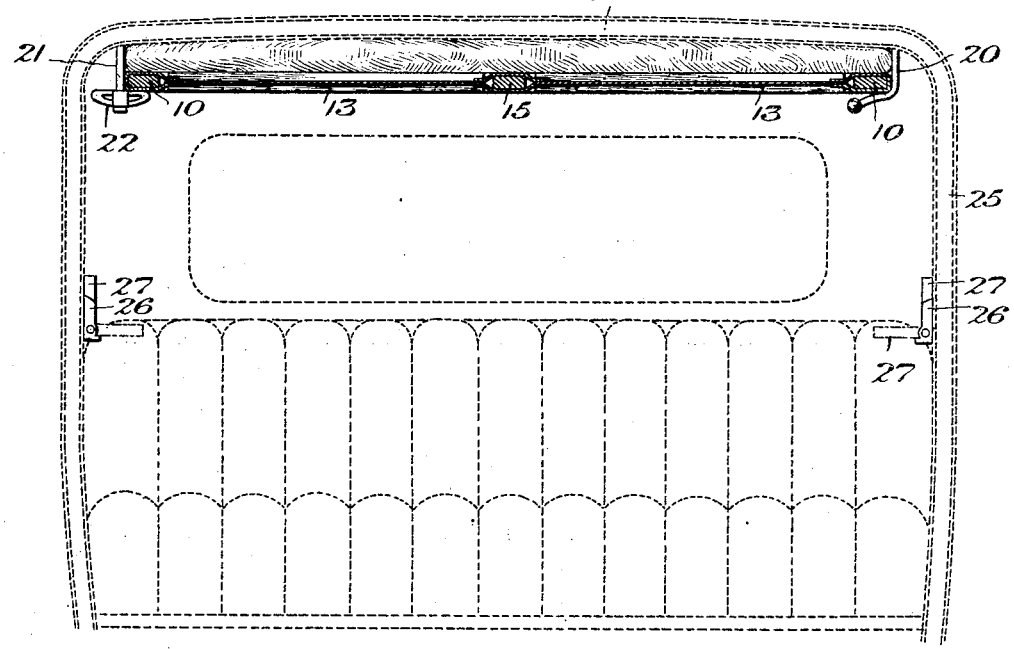
Figure 4:
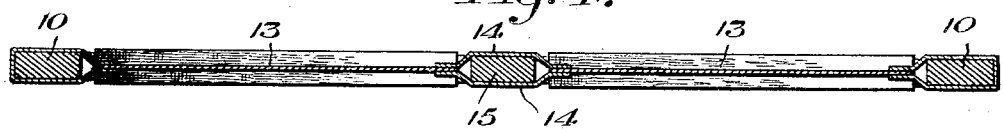
Figure 4 is an enlarged transverse section taken through the bed frame with its fabric.

Referring to the drawings the bed frame is made up of a pair of lengthwise extending side bars 10 joined at their opposite ends by end pieces 11, the connections being separable if desired and held together by screws 12 or the like. A bottom fabric 13 of canvas or the like is hemmed at opposite longitudinal edges to provide sleeves through which side bars 10 may be inserted, and a connecting strip 14 also preferably of canvas is stitched to the intermediate longitudinal portion of the bottom 13 to receive therethrough a central bar 15 which forms a part of the frame. The bar 15 is fitted at its ends in suitably formed recesses in the end bars 11 and is connected thereto by screws 16 or the like. The bottom 13 is held in longitudinally stretched position in the frame by flaps 17 or the like which are engaged about the end bars 11 at opposite sides of the central bar 15, and which are stitched or otherwise suitably secured to the opposite ends of the fabric bottom 13. The bed frame is thus filled in with a canvas bottom 13 adapted to support bedding 18, as shown in Figure 1, and the side and end frame bars 10 and 11 provide a marginal flange or rim which retains the bedding from displacement from the frame, and the central bar 15 also aids in preventing the bedding from shifting incident to use or to the vibration of the vehicle when in motion.

The bed frame when not in use is adapted to be supported up against the roof 19 of the vehicle and for this purpose a number of fixed supports 20 are secured against the under side of the roof 19 and may be in the form of substantially right angle screw rods threaded at their upper ends into the roof 19 and at their lower end projecting substantially horizontally and inwardly to receive one longitudinal edge portion of the bed frame. As shown in Figure 3, the horizontal portions of the fixed supports 20 may be curved downwardly at their free ends to a slight degree to facilitate the insertion of the lateral edge portion of the bed frame upwardly into the fixed supports 20 when the bed is raised into position out of the way. These fixed supports 20 may be of any suitable number and are located along one side of the vehicle. The other side of the vehicle is provided with a suitable number of releasable supports 21 which may be in the form of turn buttons or winged screws which are threaded or otherwise suitably secured into the under side of the roof 19, the wings 22 of the supports 21 being adapted to engage the under side of the bed frame at its opposite longitudinal edge portion. The supports 20 and 21 are arranged in longitudinal rows at opposite sides of the vehicle and spaced apart from each other a distance equal substantially to the width of the bed frame, as shown in Figure 3, so as to firmly support the frame against the under side of the roof 19 and to hold the frame and its parts against vibration or accidental dislodgement.

When the bed frame is released from the supports 20 and 21 it is adapted to be lowered into position across the backs of the seats 23 and 24 of the vehicle body, and in order to support the bed in lowered position and in a substantially true horizontal plane, the vehicle body 25 may be provided within its opposite sides with pairs of brackets 26 provided with swinging arms or sections 27 adapted to be swung down into horizontal position, so as to engage beneath the longitudinal edge portions of the bed frame when the latter is lowered. Any suitable type of bracket 26 may be employed to accommodate the bed frame as to width and construction. The supporting portions 27 of the brackets 26 are shown as pivoted, although they may be of any other suitable construction, and in the present instance the portions 27 may be swung upwardly out of the way when the bed is raised as shown in Figure 3. The structure of the body 25 is such that the bed frame is of less width than the distance between the opposite inner sides of the body 25 and consequently when the bed is lowered the portions 27 of the brackets must necessarily be of sufficient length to support the bed frame. These proportions may, of course, be varied with different types of vehicle bodies but the above described construction admits of the use of the improved bed and supports with vehicle bodies of different types and dimensions.

When it is desired to use the bed it is only necessary to turn the releasable supports 21 by hand through a quarter turn so as to release one side of the bed frame. The bed frame may now be first lowered at the released side and then drawn laterally to disengage the opposite side of the bed frame from the fixed supports 20. The bed frame may be now lowered on to the backs of the seats or across the horizontal portions 27 of the brackets 26. The portions 27 of the brackets are swung down into the dotted line positions, shown in Figure 3 to receive the bed as it is lowered.

In storing the bed out of the way, it is merely raised, one edge thereof inserted upwardly into the fixed brackets 20, and then the other edge of the bed or frame is swung upwardly against the roof 19, compressing the bedding to hold it firmly in place and then the releasable supports 21 are turned back into position to engage the wings 22 beneath the edge portion of the frame. The arms 27 are now swung upwardly into the brackets 26 out of the way and it is found that the bed when thus stored against the roof of the vehicle body is out of the way and leaves sufficient clearance or head room in the top of the vehicle.

Figure 5:
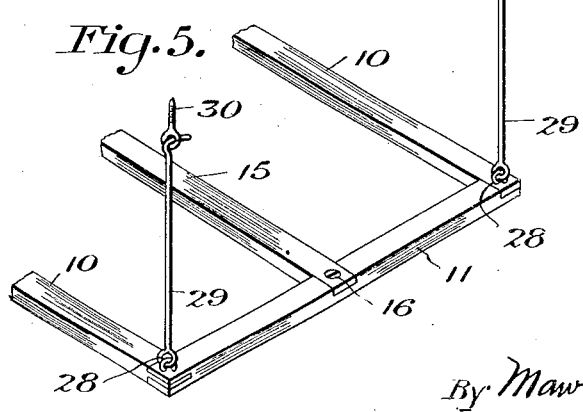
Figure 5 is a fragmentary perspective view of one end of the bed frame, showing a slight modification applied thereof.
Figure 6:
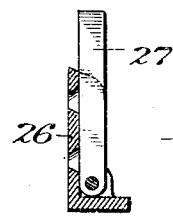
Figure 6 is a detail sectional view taken through one of the supporting brackets used for holding the bed when in position for use.

In Figure 5 a slight modification is shown wherein the retaining screws 12 at the forward corners of the bed frame was replaced by screw eyes 28 in which are hinged hooks 29 having relatively long shanks. The hooks 29 are adapted to releasably engage at their free ends in screw eyes 30 which are secured against the under side of the roof 19 substantially in register with the front end of the bed frame. The use of the hooks 29 is adapted particularly where the top of the vehicle is of the open type and wherein the brackets 26 cannot be readily installed.

It is also apparent that where the open top is used the bed frame may be knocked down, such as by removing the screw eyes 28 and the screw 16 so as to release the end bars 11. The lengthwise extending bars 10 and 15 together with the loose end bars 11 may be rolled or folded up into the canvas to occupy but small space should it be desired to knock-down the bed frame.

It is obvious that various changes and modifications may be made in the details of construction and design of the above specifically described embodiment of this invention without departing from the spirit thereof, such changes and modifications being restricted only by the scope of the following claim.

What is claimed is:—

A tourist bed for adjustment within a vehicle body without removal therefrom comprising a bed frame, shallow hook members secured against the under side of the roof of the vehicle body near one edge thereof for receiving the adjacent edge portion of the bed frame by a slight lateral shifting thereof and adapted to release the bed frame upon a slight shifting thereof in an opposite direction, and means including turn-buttons carried beneath the roof of the vehicle body for engagement with the opposite edge of the bed frame for releasably holding the same whereby said bed frame may be released from beneath the roof and lowered into position for use, and means in the body of the vehicle for supporting the bed frame in lowered position.

In testimony whereof I affix my signature.

CHRISTIAN HEUMADER.